United States Patent
Kye et al.

(10) Patent No.: US 11,184,822 B2
(45) Date of Patent: Nov. 23, 2021

(54) ELECTRONIC DEVICE FOR PERFORMING HANDOVER IN WIRELESS NETWORK ENVIRONMENT AND METHOD THEREOF

(71) Applicant: Samsung Electronics Co., Ltd., Gyeonggi-do (KR)

(72) Inventors: Jaemin Kye, Gyeonggi-do (KR); Seungho Yang, Gyeonggi-do (KR); Shinduck Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/787,346

(22) Filed: Feb. 11, 2020

(65) Prior Publication Data

US 2020/0267618 A1  Aug. 20, 2020

(30) Foreign Application Priority Data

Feb. 15, 2019 (KR) .......................... 10-2019-0017704

(51) Int. Cl.
| | |
|---|---|
| *H04W 4/00* | (2018.01) |
| *H04W 36/14* | (2009.01) |
| *H04W 36/24* | (2009.01) |
| *H04W 84/12* | (2009.01) |

(52) U.S. Cl.
CPC .......... *H04W 36/14* (2013.01); *H04W 36/24* (2013.01); *H04W 84/12* (2013.01)

(58) Field of Classification Search
CPC ..... H04W 36/14; H04W 36/24; H04W 84/12; H04W 36/30; H04W 76/15
USPC ......................................... 455/312; 370/331
See application file for complete search history.

(56) References Cited

U.S. PATENT DOCUMENTS

| | | |
|---|---|---|
| 5,493,568 A | 2/1996 | Sampat et al. |
| 5,506,832 A | 4/1996 | Arshi et al. |
| 5,524,110 A | 6/1996 | Danneels et al. |
| 5,774,674 A | 6/1998 | Gutmann et al. |
| 9,226,215 B2 | 12/2015 | Yang et al. |
| 9,277,176 B2 | 3/2016 | Khay-Ibbat et al. |
| 9,521,699 B2 | 12/2016 | Khay-Ibbat et al. |
| 9,800,625 B2 | 10/2017 | Hua et al. |

(Continued)

FOREIGN PATENT DOCUMENTS

| | | |
|---|---|---|
| KR | 10-1752419 B1 | 6/2017 |
| WO | 2015/003126 A1 | 1/2015 |

OTHER PUBLICATIONS

International Search Report dated Jun. 11, 2020.

*Primary Examiner* — Marcos Batista
(74) *Attorney, Agent, or Firm* — Cha & Reiter, LLC

(57) ABSTRACT

An electronic device and method are disclosed. The device includes: first wireless communication circuitry for a 5G network, second wireless communication circuitry for a 4G network or a WiFi network, at least one processor. The processor implements the method, including: establishing a video call with an external electronic device on the 4G network or the WiFi network, identify a resolution of the video call, setting a reference value for executing a first handover to the 5G network to be less than a default value, maintain the reference value, when the identified resolution is less than the predetermined threshold resolution, and perform the first handover from the 4G network or the WiFi network to the 5G network, when a RSSI intensity of a signal from the 5G network.

15 Claims, 9 Drawing Sheets

(56) References Cited

U.S. PATENT DOCUMENTS

| | | |
|---|---|---|
| 9,888,515 B2 | 2/2018 | Chaugule et al. |
| 2014/0176659 A1 | 6/2014 | Khay-Ibbat et al. |
| 2015/0009963 A1 | 1/2015 | Yang et al. |
| 2016/0249399 A1 | 8/2016 | Khay-Ibbat et al. |
| 2017/0171254 A1* | 6/2017 | Hua .................. H04N 7/15 |
| 2017/0325273 A1 | 11/2017 | Chaugule et al. |

* cited by examiner

ELECTRONIC DEVICE FOR PERFORMING HANDOVER IN WIRELESS NETWORK ENVIRONMENT AND METHOD THEREOF

CROSS-REFERENCE TO RELATED APPLICATION(S)

This application is based on and claims priority under 35 U.S.C. § 119 to Korean Patent Application No. 10-2019-0017704, filed on Feb. 15, 2019, in the Korean Intellectual Property Office, the disclosure of which is incorporated by reference herein its entirety.

BACKGROUND

1. Field

The disclosure relates to an electronic device for performing a handover in a wireless network environment and a method thereof.

2. Description of Related Art

An electronic device may support an internet protocol (IP) multimedia subsystem (IMS) call, for performing a call function using an IP network. For example, the electronic device may support an IMS call using "voice over long term evolution" (VoLTE) of an LTE network, or by using "voice over wireless fidelity" (VoWiFi) of a WiFi network.

The above information is presented as background information only to assist with an understanding of the present disclosure. No determination has been made, and no assertion is made, as to whether any of the above might be applicable as prior art with regard to the present disclosure.

SUMMARY

When an electronic device is moved while an IMS call is underway, the electronic device may perform a "handover" operation, in order to maintain continued execution of the call. The handover operation may indicate a transition between two different cells (within a cellular network) which support the same network, or a handover between cells supportive of different or divergent networks (e.g., an LTE network and a WiFi network).

A standard specification for a $5^{th}$ generation network subsequent to a $4^{th}$ generation network (e.g., LTE) is defined by $3^{rd}$ generation partnership project (3GPP). The 5G network may be referred to as a new radio (NR) network. Because it is able for the 5G network to provide a higher data transfer rate than the 4G network, the electronic device may provide a high-quality video call service to a user over the 5G network.

Aspects of the disclosure are to address at least the above-mentioned problems and/or disadvantages and to provide at least the advantages described below.

In accordance with an aspect of the disclosure, an electronic device is provided. The electronic device may include first wireless communication circuitry configured to support a $5^{th}$ generation (5G) network, second wireless communication circuitry configured to support a $4^{th}$ generation (4G) network or a wireless fidelity (WiFi) network, at least one processor operatively connected with the first wireless communication circuitry and the second wireless communication circuitry, and a memory operatively connected with the at least one processor, wherein the memory stores instructions that are executable to cause the at least one processor to: establish a video call with an external electronic device on the 4G network or the WiFi network, via the second wireless communication circuitry, identify a resolution of the video call, as negotiated within a call establishment procedure executed to establish the video call, set a reference value for executing a first handover to the 5G network to be less than a default value, when the identified resolution is greater than or equal to a predetermined threshold resolution, maintain the reference value, when the identified resolution is less than the predetermined threshold resolution, and perform the first handover from the 4G network or the WiFi network to the 5G network, when a received signal strength indicator (RSSI) intensity of a signal from the 5G network, as measured by the first wireless communication circuitry is greater than or equal to the reference value In accordance with another aspect of the disclosure, a method of an electronic device is provided. The method may include establishing, by a first wireless communication circuitry, a video call with an external electronic device over a 4G network or a WiFi network, identifying, by a processor, resolution of video call, as negotiated within a call establishment procedure for establishing the video call, setting, by the processor, a reference value for executing a first handover to a 5G network to be less than a default value, when the identified resolution is greater than or equal to a predetermined threshold resolution, performing the first handover from the 4G network or the WiFi network to the 5G network, when a received signal strength indicator (RSSI0 intensity of a signal from the 5G network, as measured by a second wireless communication circuitry, is greater than or equal to the set reference value.

In accordance with another aspect of the disclosure, an electronic device is provided. The electronic device may include a 5G communication circuitry configured to communicate over a 5G network, a 4G communication circuitry configured to communicate over a 4G network, a WiFi communication circuitry configured to communicate over a WiFi network, at least one processor operatively connected with the 5G communication circuitry, the 4G communication circuitry, and the WiFi communication circuitry, wherein the at least one processor is configured to: register an IMS with the WiFi network via the WiFi communication circuitry, identify a priority connection mode for the IMS, perform a handover from the WiFi network to the 5G network or the 4G network based on a plurality of thresholds for performing a handover to the WiFi network, when the identified priority connection mode is a WiFi priority connection mode, and perform the handover from the WiFi network to the 5G network or the 4G network based on a 4G signal intensity and a 5G signal intensity obtained at a prespecified period, when the identified priority connection mode is a cellular priority connection mode.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, certain embodiments of the disclosure may be described with reference to accompanying drawings. Accordingly, those of ordinary skill in the art will recognize that modification, equivalent, and/or alternative on the certain embodiments described herein can be variously made without departing from the disclosure.

Figure 1:
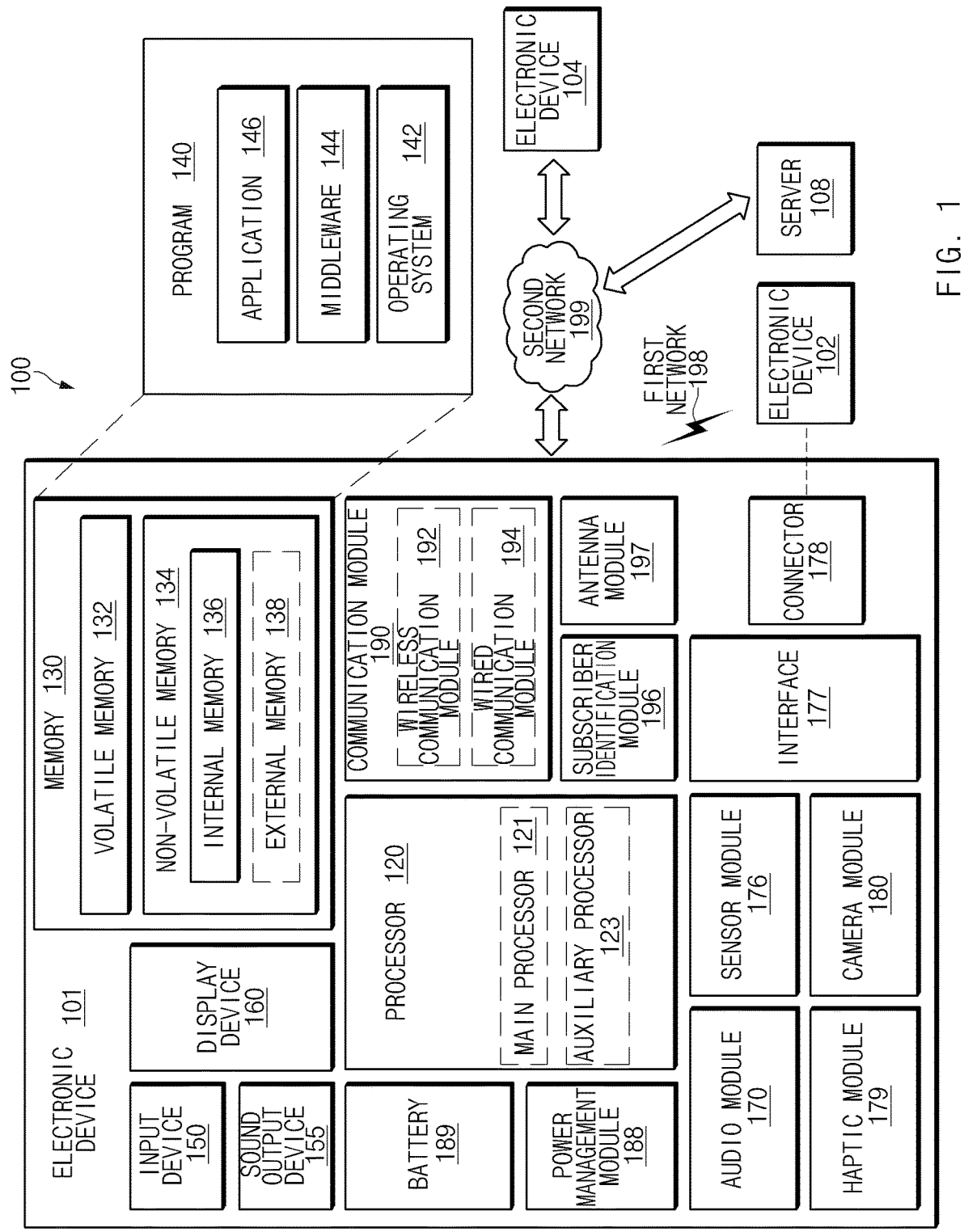
FIG. 1 is a block diagram illustrating an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
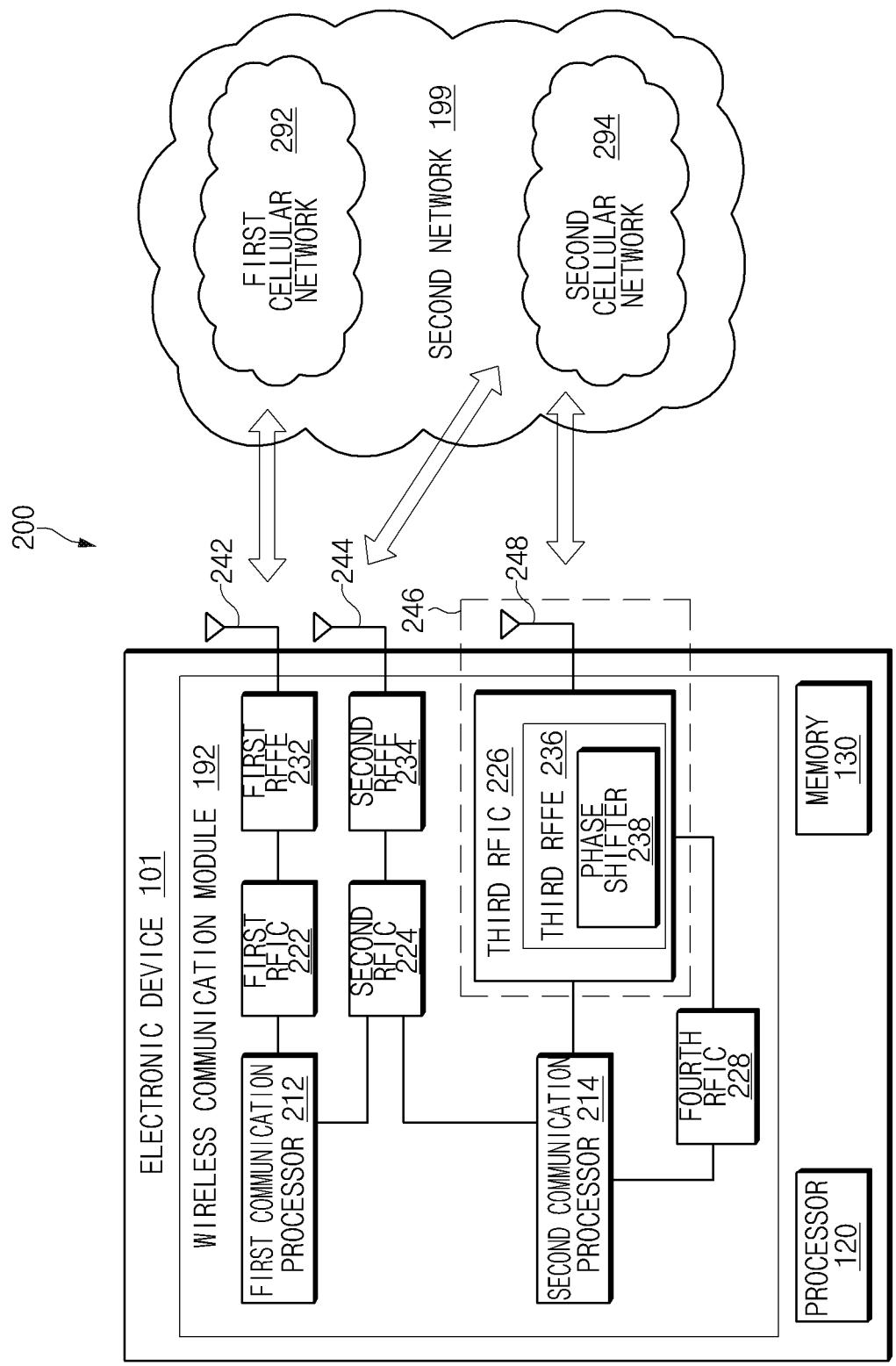
FIG. 2 is a block diagram illustrating an electronic device for supporting legacy network communication and 5G network communication, according to certain embodiments.

FIG. 2 is a block diagram 200 illustrating an electronic device 101 supporting legacy network communication and a 5G network communication. Components of the electronic device 101 or a second network 199, shown in FIG. 2, may perform the same or similar function to components or a network indicating the same reference numerals, shown in FIG. 1.

Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to other embodiments, the electronic device 101 may further include at least one of the components shown in FIG. 1. The second network 199 may further include at least one other network. According to an embodiment, the first communication processor 212, the second communication processor 214, the first RFIC 222, the second RFIC 224, the fourth RFIC 228, the first RFFE 232, and the second RFFE 234 may configure at least a part of a wireless communication module 192 of FIG. 1. According to another embodiment, the fourth RFIC 228 may be omitted or may be included as a part of the third RFIC 226.

The first communication processor 212 may establish a communication channel of a band to be used for wireless communication with the first cellular network 292 and may support legacy network communication over the established communication channel. According to an embodiment, the first cellular network 292 may be a legacy network including $2^{nd}$ generation (2G), $3^{rd}$ generation (3G), $4^{th}$ generation (4G), and/or long term evolution (LTE) network(s). The second communication processor 214 may establish a communication channel corresponding to a specified band (e.g., about 6 GHz to about 60 GHz) among bands to be used for wireless communication with the second cellular network 294 and may support $5^{th}$ generation (5G) network communication over the established communication channel. According to an embodiment, the second cellular network 294 may be a 5G network defined in $3^{rd}$ generation partnership project (3GPP). In addition, according to an embodiment, the first communication processor 212 or the second communication processor 214 may establish a communication channel corresponding to another specified band (e.g., about 6 GHz or less) among bands used for wireless communication with the second cellular network 294 and may support 5G network communication over the established communication channel. According to an embodiment, the first communication processor 212 and the second communication processor 214 may be implemented in a single chip or a single package. According to an embodiment, the first communication processor 212 or the second communication processor 214 may be configured together with the processor 120, an auxiliary processor 123 of FIG. 1, or a communication module 190 of FIG. 1 in a single chip or a single package.

Upon transmission, the first RFIC 222 may convert a baseband signal generated by the first communication processor 212 into an RF signal of about 700 MHz to about 3 GHz used for the first cellular network 292 (e.g., the legacy network). Upon reception, an RF signal may be obtained from the first cellular network 292 (e.g., the legacy network) via an antenna (e.g., the first antenna module 242) and may be preprocessed via an RFFE (e.g., the first RFFE 232). The first RFIC 222 may convert the preprocessed RF signal into a baseband signal to be able to be processed by the first communication processor 212.

Upon transmission, the second RFIC 224 may convert a baseband signal generated by the first communication processor 212 or the second communication processor 214 into an RF signal of a Sub6 band (e.g., about 6 GHz or less) (hereinafter referred to as "5G Sub6 RF signal") used for the second cellular network 294 (e.g., the 5G network). Upon reception, a 5G Sub6 RF signal may be obtained from the second cellular network 294 (e.g., the 5G network) via an antenna (e.g., the second antenna module 244) and may be preprocessed via an RFFE (e.g., the second RFFE 234). The second RFIC 224 may convert the preprocessed 5G Sub6 RF signal into a baseband signal to be able to be processed by a corresponding communication processor between the communication processor 212 or the second communication processor 214.

The third RFIC 226 may convert a baseband signal generated by the second communication processor 214 into an RF signal of a 5G Above6 band (e.g., about 6 GHz to about 60 GHz) (hereinafter referred to as "5G Above6 RF signal") to be used in the second cellular network 294 (e.g., the 5G network). Upon reception, a 5G Above6 RF signal may be obtained from the second cellular network 294 (e.g., the 5G network) via an antenna (e.g., the antenna 248) and may be preprocessed via the third RFFE 236. For example, the third RFFE 236 may preprocess a signal using a phase shifter 238. The third RFIC 226 may convert the preprocessed 5G Above6 RF signal into a baseband signal to be able to be processed by the second communication processor 214. According to an embodiment, the third RFFE 236 may be configured as a part of the third RFIC 226.

According to an embodiment, the electronic device 101 may include the fourth RFIC 228 independently of the third RFIC 226 or as at least a part of the third RFIC 226. In this case, the fourth RFIC 228 may convert a baseband signal generated by the second communication processor 214 into an RF signal of an intermediate frequency band (e.g., about 9 GHz to about 11 GHz) (hereinafter referred to as "IF signal") and may delivery the IF signal to the third RFIC 226. The third RFIC 226 may convert the IF signal into a 5G Above6 RF signal. Upon reception, a 5G Above6 RF signal may be received from the second cellular network 294 (e.g., the 5G network) via an antenna (e.g., the antenna 248) and may be converted into an IF signal by the third RFIC 226. The fourth RFIC 228 may convert the IF signal into a baseband signal to be able to be processed by the second communication processor 214.

According to an embodiment, the first RFIC 222 and the second RFIC 224 may be implemented as at least a part of a single chip or a single package. According to an embodiment, the RFFE 232 and the second RFFE 234 may be implemented as at least a part of a single chip or a single package. According to an embodiment, at least one of the first antenna module 242 or the second antenna module 244 may be omitted or may be combined with another antenna module to process RF signals of a plurality of corresponding bands.

According to an embodiment, the third RFIC 226 and the antenna 248 may be arranged on the same substrate to configure the third antenna module 246. For example, the wireless communication module 192 or the processor 120 may be arranged on a first substrate (e.g., a main printed circuit board (PCB)). In this case, as the third RFIC 226 is disposed on a partial region (e.g., a lower surface) of a second substrate (e.g., a sub-PCB) independent of the first substrate and as the antenna 248 is disposed on another partial region (e.g., an upper surface), the third antenna module 246 may be configured. According to an embodiment, the antenna 248 may include, for example, an antenna array which may be used for beamforming. As the third RFIC 226 and the antenna 248 are arranged on the same substrate, it is possible to reduce a length of a transmission line between the third RFIC 226 and the antenna 248. For example, this may reduce that, for example, a signal of a high frequency band (e.g., about 6 GHz to about 60 GHz) used for 5G network communication is lost (e.g., attenuated) by the transmission line. Due to this, the electronic device 101 may enhance quality or speed of communication with the second cellular network 294 (e.g., the 5G network).

The second cellular network 294 (e.g., the 5G network) may be operated independently of the first cellular network 292 (e.g., the legacy network) (e.g., stand-alone (SA)) or may be connected and operated with the first cellular network 292 (e.g., the legacy network) (e.g., non-standalone (NSA)). For example, there may be an access network (e.g., a 5G radio access network (RAN) or a next generation RAN (NG RAN)) in the 5G network and there may be no core network (e.g., next generation core (NGC)) in the 5G network. In this case, the electronic device 101 may access the access network of the 5G network and may then access an external network (e.g., the Internet) under control of a core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 130 and may be accessed by another component (e.g., the processor 120, the first communication processor 212, or the second communication processor 214).

Figure 3:
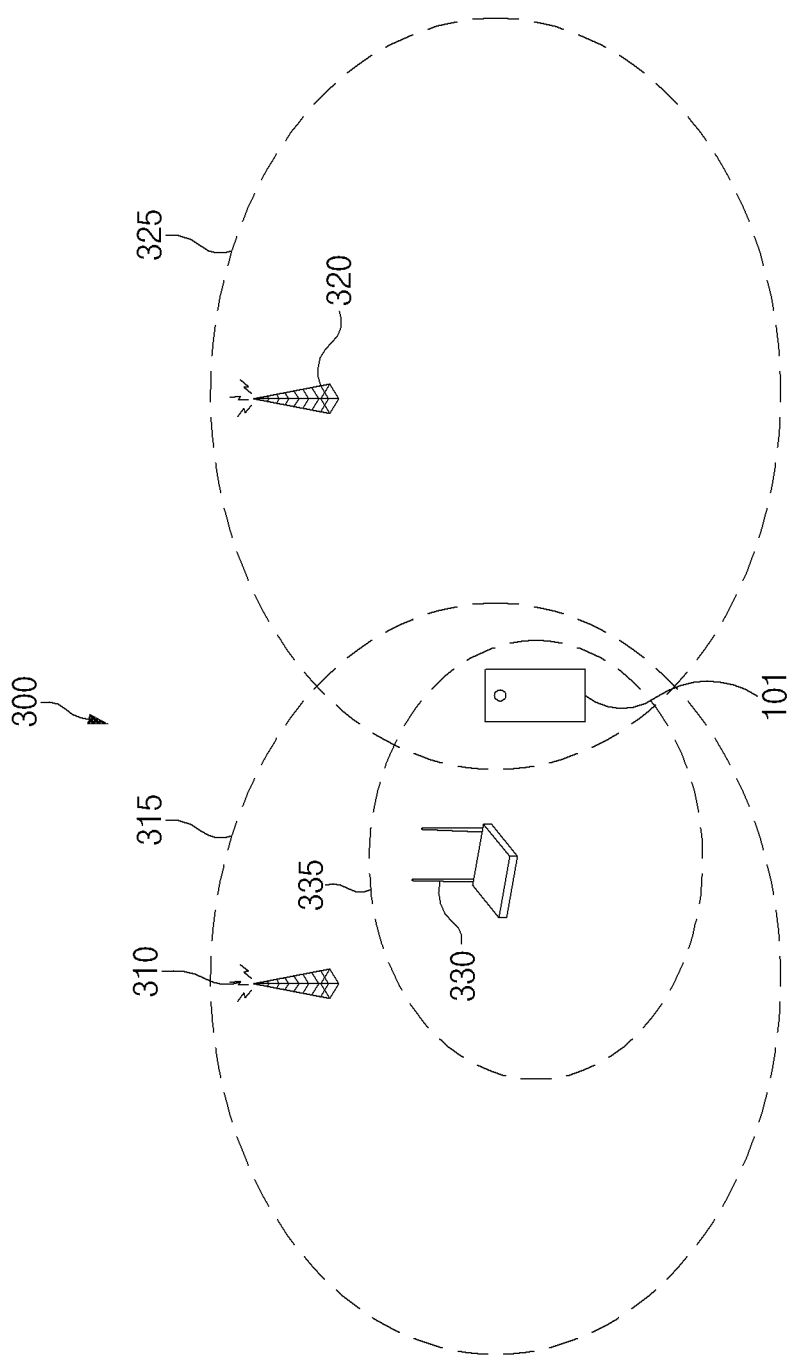
FIG. 3 is a drawing illustrating a handover operation of an electronic device in a network environment according to certain embodiments.

FIG. 3 is a drawing illustrating a handover operation of an electronic device in a network environment 300 according to an embodiment.

Referring to FIG. 3, the network environment 300 (e.g., a network environment 100 of FIG. 1) may include multiple heterogeneous networks. For example, the electronic device 101 may transmit or receive an RF signal of a 4G network (or a first cellular network 292 of FIG. 2) within a first cell 315 of a first base station 310. The RF signal of the 4G network may be referred to as a 4G signal. For another example, the electronic device 101 may transmit or receive an RF signal of a 5G network (e.g., a second cellular network 294 of FIG. 2) within a second cell 325 of a second base station 320. The RF signal of the 5G network may be referred to as a 5G signal. For another example, the electronic device 101 may transmit or receive a wireless fidelity (WiFi) signal within a coverage area 335 of an access point (AP) 330.

According to an embodiment, the electronic device 101 may perform an Internet protocol multimedia subsystem (IMS) call function within at least one of the first cell 315, the second cell 325, or the coverage area 335. The electronic device 101 may provide a video call service as well and/or a voice call service by performing the IMS call function using data communication (e.g., a mobile data connection). When performing the IMS call function, the electronic device 101 may establish a call (e.g., a video call or a voice call) with an external electronic device, based on a communication network including a cell (i.e., a coverage-enabling cell) where the electronic device 101 is located. The IMS call function provided by the 4G network may be referred to as "voice over long-term evolution" (VoLTE), and the IMS call function provided by a WiFi network may be referred to as "voice over WiFi" (VoWiFi).

According to an embodiment, when moving to a communication/boundary between at least two or more of the first cell 315, the second cell 325, and/or the coverage area 335 or moving to a location close to the boundary by mobility of the electronic device 101, the electronic device 101 may execute a handover operation. For example, when moving from the coverage area 335 to the first cell 315, the electronic device 101 may execute a handover from the WiFi network and the 4G network. According to an embodiment, the electronic device 101 may perform a handover operation either in an idle state or and/or when a call is established and in-progress.

According to an embodiment, the electronic device 101 may initiate a handover operation based on whether intensity of a received signal is less than (or in other cases, greater than or equal to) a previously specified threshold. For example, while the electronic device 101 is connected to the WiFi network, when intensity of a WiFi signal received from the AP 330 is less than the specified threshold and when intensity of a 4G signal received from the first base station 310 is greater than or equal to the specified threshold, the electronic device 101 may perform a handover from the WiFi network to the 4G network. The threshold used to perform a handover to the WiFi network may be referred to as WiFi threshold, and the threshold used to perform a handover to the 4G network may be referred to as a 4G threshold, and the threshold used to perform a handover to the 5G network may be referred to as a 5G threshold. The electronic device 101 may trigger a handover based on intensity of a signal to stably perform the handover and ensure call continuity. Thresholds for a handover between different networks may be different from or substantially similar to each other for each network.

According to an embodiment, the electronic device 101 may determine a priority of a handover operation based on a priority connection mode. The priority connection mode may include a WiFi priority connection mode and a cellular priority connection mode. For example, when the priority connection mode of the electronic device 101 is the WiFi priority connection mode and when intensity of a WiFi signal received while the electronic device 101 is connected to the WiFi network is greater than or equal to the specified threshold, the electronic device 101 may fail to perform a handover irrespective of intensity of a 4G signal and a 5G signal. For another example, when the priority connection mode of the electronic device 101 is the cellular priority connection mode and when intensity of a 4G or 5G signal received while the electronic device 101 is connected to the WiFi network is greater than or equal to the threshold, the electronic device 101 may perform a handover irrespective of intensity of a WiFi signal.

According to an embodiment, the priority connection mode of the electronic device 101 may be determined based on at least one of quality of service (QoS) of an IMS call or a billing policy for a network or may be determined by a user setting. The electronic device 101 may perform or may fail to perform a handover based on a priority to ensure call continuity at the same time as providing a high-quality IMS call service.

According to an embodiment, when establishing a call for video call, the electronic device 101 may control a 5G threshold based on resolution of the video call. To prevent a confusion of terms with other thresholds, the 5G threshold may be referred to as a reference value. For example, when resolution of video call is high, the electronic device 101 may set the 5G threshold to be lower than a default value to more frequently perform a handover to the 5G network. Through the above-mentioned method, the electronic device 101 may provide a high-quality video call service.

Figure 4:
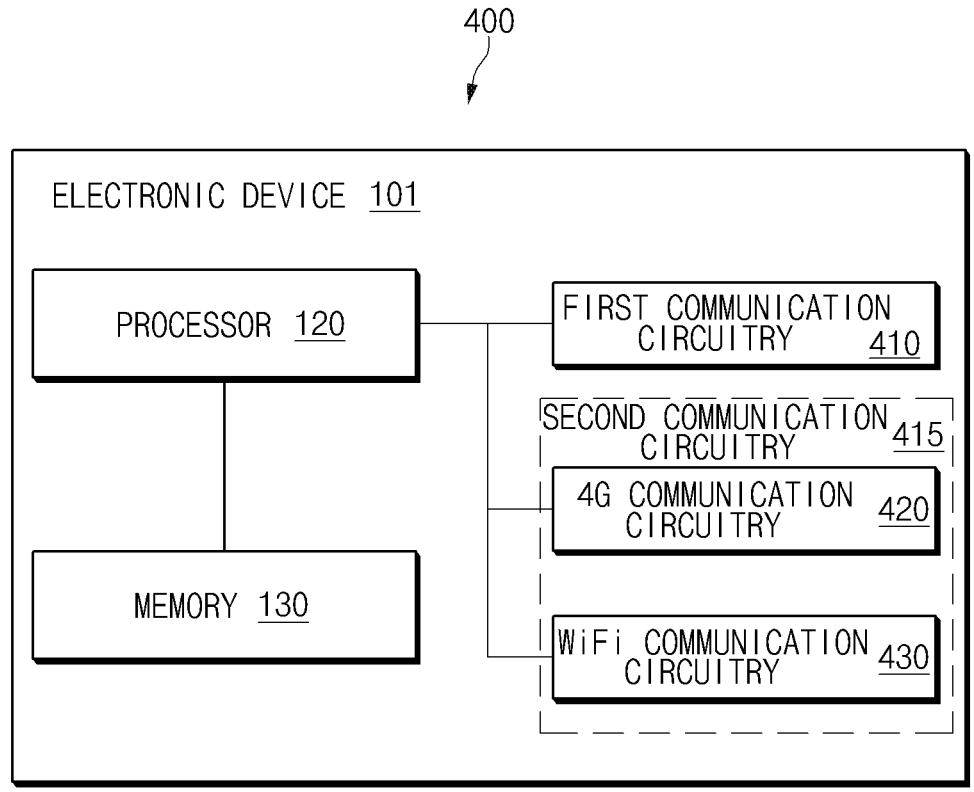
FIG. 4 is a block diagram illustrating an electronic device for performing a handover according to certain embodiments.

FIG. 4 is a block diagram 400 illustrating an electronic device 101 for performing a handover according to an embodiment.

Referring to FIG. 4, an electronic device 101 may include a processor 120, a memory 130, a first wireless communication circuitry 410, and a second wireless communication circuitry 415. The electronic device 101 may further include at least one of components shown in FIG. 1 or 2 other than the components shown in FIG. 4. For example, the electronic device 101 may further include at least one of a first antenna module 242, a second antenna module 244, or an antenna 248 of FIG. 2.

The first wireless communication circuitry 410 may support a 5G network. In this case, the first wireless communication circuitry 410 may be referred to as a 5G communication circuitry. The first wireless communication circuitry 410 may transmit or receive a 5G signal of a frequency band used on the 5G network. The first wireless communication circuitry 410 may include a second communication processor 214 and a third RFIC 226 (or a second RFIC 224 and a second RFFE 234) of FIG. 2. In this case, the second communication processor 214 and the third RFIC 226 may be configured as a separate single chip or as one package.

The second wireless communication circuitry 415 may include at least one communication circuitry which supports another network (e.g., a legacy network or a WiFi network of FIG. 2) except for the 5G network. For example, the second wireless communication circuitry 415 may include a 4G communication circuitry 420 and a WiFi communication circuitry 430.

The 4G communication circuitry 420 may support a 4G network. The 4G communication circuitry 420 may transmit or receive a 4G signal of a frequency band used on the 4G network. The 4G communication circuitry 420 may include a first communication processor 212 and a first RFIC 222 and a first RFFE 232 (or the second RFIC 224 and the second RFFE 234) of FIG. 2. In this case, the first communication processor 212, the first RFIC 222, and the first RFFE 232 may be configured as a separate single chip or one package.

The WiFi communication circuitry 430 may support a WiFi network. The WiFi communication circuitry 430 may transmit or receive a WiFi signal of a frequency band used on the WiFi network. The WiFi communication circuitry 430 may form at least a part of a wireless communication circuitry 190 of FIG. 1.

The memory 130 may be operatively connected with the processor 120 and may store instructions causing the processor 120 to perform an overall operation of the electronic device 101. According to an embodiment, the memory 130 may perform a database (DB) function for storing data used by the processor 120. For example, the memory 130 may store information indicating resolution of video call negotiated through a call establishment procedure, threshold resolution, a reference value used to perform a handover to the 5G network, intensity of a signal obtained from a wireless communication circuitry (e.g., the first wireless communication circuitry 410, the 4G communication circuitry 420, or the WiFi communication circuitry 430), and/or at least one threshold used to perform a handover.

The processor 120 may be operatively connected with the first wireless communication circuitry 410, the 4G communication circuitry 420, the WiFi communication circuitry 430, and the memory 130 and may control an overall operation of the electronic device 101 for performing a handover. According to an embodiment, the processor 120 may include at least one processor. The at least one processor may include, for example, an application processor (AP) or a communication processor (CP).

According to an embodiment, the processor 120 may obtain information indicating resolution of video call in a call establishment procedure via the first wireless communication circuitry 410 and may control a 5G threshold for performing a handover to the 5G network based on the resolution.

According to an embodiment, the processor 120 may obtain information indicating intensity of a signal measured by the wireless communication circuitry (e.g., the first wireless communication circuitry 410, the 4G communication circuitry 420, or the WiFi communication circuitry 430) from the wireless communication circuitry (e.g., the first wireless communication circuitry 410, the 4G communication circuitry 420, or the WiFi communication circuitry 430). For example, the processor 120 may obtain information indicating intensity of a 5G signal from the first wireless communication circuitry 410, may obtain information indicating intensity of a 4G signal from the 4G communication circuitry 420, or may obtain information indicating intensity of a WiFi signal from the WiFi communication circuitry 430.

According to an embodiment, the processor 120 may perform a handover based on a priority connection mode indicating a priority of a handover of the electronic device 101. For example, when the priority connection mode is a WiFi priority connection mode, the processor 120 may first consider intensity of a WiFi signal to perform a handover. For another example, when the priority connection mode is a cellular priority connection mode, the processor 120 may first consider intensity of at least one of a 4G signal or a 5G signal to perform a handover.

Because power of the processor 120 is consumed while the processor 120 obtains information indicating intensity of a signal from the wireless communication circuitry (e.g., the first wireless communication circuitry 410, the 4G communication circuitry 420, or the WiFi communication circuitry 430), the processor 120 according to an embodiment may obtain information indicating intensity of a signal depending on a specified condition (e.g., a plurality of thresholds) or in a specified period. A description will be given below of an embodiment of obtaining the information depending on the specified condition with reference to FIG. 8. A description will be given below of an embodiment of obtaining the information in the specified period with reference to FIG. 9.

Figure 5:
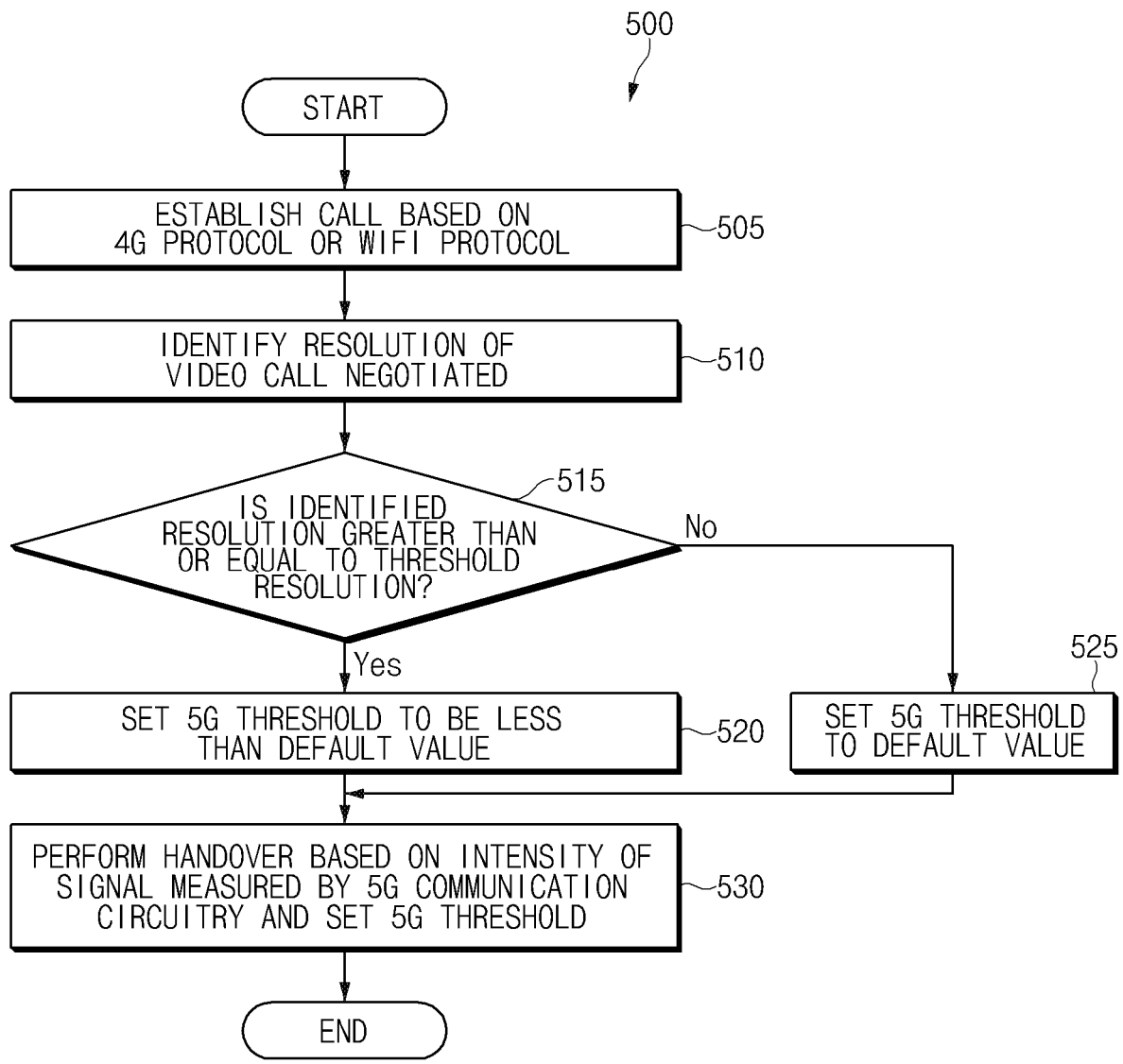
FIG. 5 is a flowchart illustrating an operation of an electronic device for performing a handover via a first wireless communication circuitry according to certain embodiments.

FIG. 5 is a flowchart 500 illustrating an operation of an electronic device 101 for performing a handover via a first wireless communication circuitry 410 according to an embodiment. Operations shown in FIG. 5 may be performed by the electronic device 101 or may be performed by a component (e.g., a processor 120) of the electronic device 101.

Referring to FIG. 5, in operation 505, the electronic device 101 may establish a call based on a 4G protocol or a WiFi protocol with an external electronic device. For example, the processor 120 may establish a call based on a 4G network via a 4G communication circuitry 420 of FIG.

4 or may establish a call based on a WiFi network via a WiFi communication circuitry 430 of FIG. 4.

In operation 510, the electronic device 101 may identify a display resolution for video call negotiated in a call establishment procedure. For example, the processor 120 may retrieve information indicating a set resolution of video call, which was previously stored in a memory (e.g., a memory 130 of FIG. 1). A description is given below of an embodiment in which the resolution of the video call is negotiated between two electronic devices, with reference to FIG. 6.

In operation 515, the electronic device 101 may identify whether the identified resolution of the video call is greater than or equal to a predetermined threshold resolution. For example, the processor 120 may compare the identified resolution of the video call with a previously specified threshold resolution. The threshold resolution may account for, for example, a video graphics array (VGA).

When the identified resolution is greater than or equal to the threshold resolution, in operation 520, the electronic device 101 may set a 5G signal intensity threshold for performing a handover to a 5G network to be less than a default value. The 5G signal intensity threshold may be set such that a handover to the 5G network frequently occurs due to the data-quantities needed to facilitate a high-fidelity resolution video call.

When the identified resolution is less than the threshold resolution, in operation 525, the electronic device 101 may set the 5G threshold to the default value using the processor 120.

In operation 530, the electronic device 101 may perform a handover to the 5G network based on intensity of a signal (e.g., a 5G signal), as measured by a 5G communication circuitry (e.g., the first wireless communication circuitry 410) and the 5G threshold set in operation 520 or 525. For example, when the intensity of the 5G signal as measured by the 5G communication circuitry is greater than or equal to the 5G threshold, the processor 120 may execute a handover to the 5G network.

Through the above-mentioned method, the electronic device 101 may control a handover to the 5G network to benefit from 5G-enabled data transfer rates, which will provide more stable media within a high-resolution video call.

Figure 6:
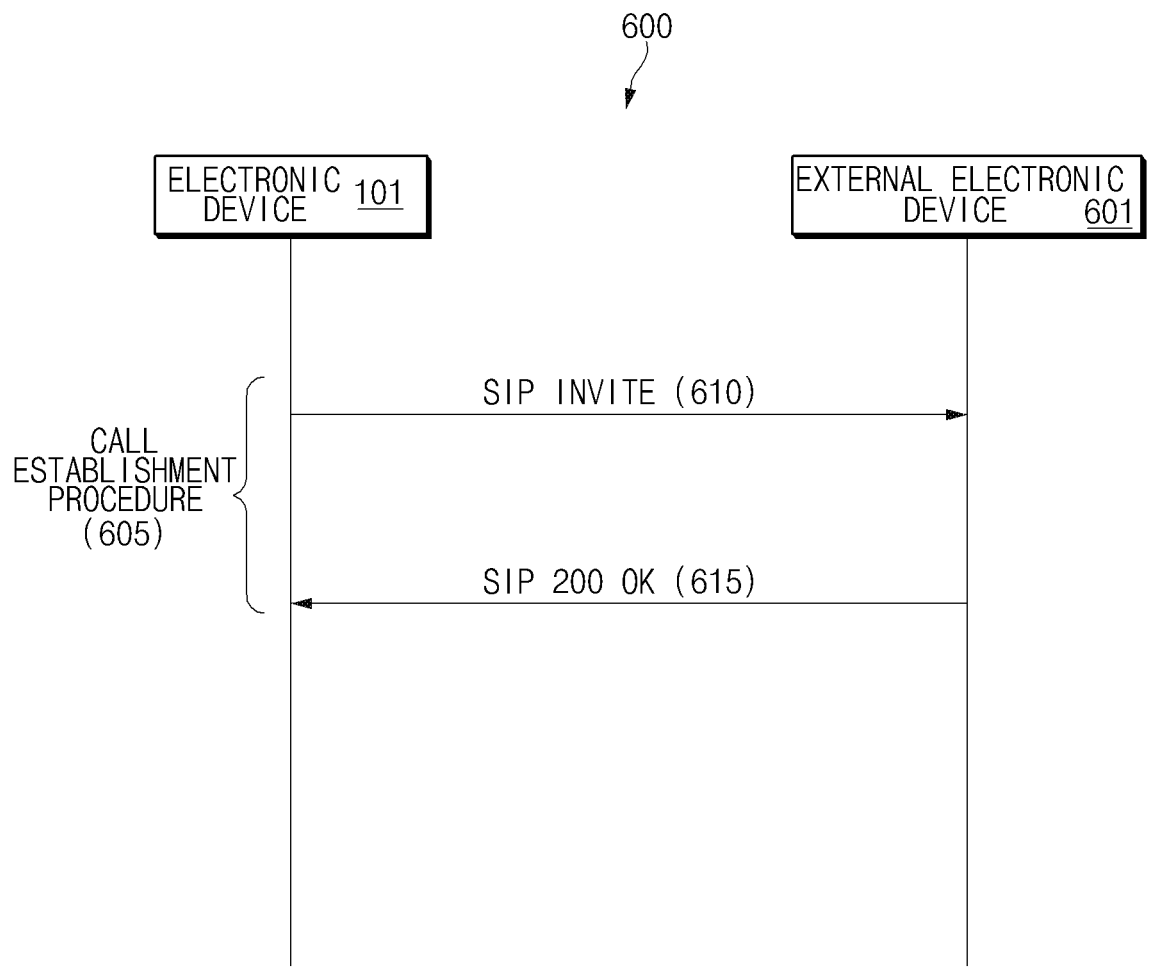
FIG. 6 is a signal sequence diagram illustrating a call establishment procedure of an electronic device according to certain embodiments.

FIG. 6 is a signal sequence diagram 600 illustrating a call establishment procedure 605 of an electronic device according to an embodiment.

Referring to FIG. 6, an electronic device 101 may request establishment of a call with an external device 601. In this case, the electronic device 101 may be referred to as "mobile originated" (MO), and the external electronic device 601 may be referred to as "mobile terminated" (MT). FIG. 6 illustrates the embodiment in which the electronic device 101 requests establishment of a call. However, according to another embodiment, the external electronic device 601 may request the electronic device 101 to establish a call. The signal sequence diagram 600 illustrates an offer/answer model which is an example of codec negotiation, but another procedure for negotiating about resolution of video call is applicable to the signal sequence diagram 600.

In operation 610, the electronic device 101 may transmit a session initiation protocol (SIP) INVITE message to the external electronic device 601, requesting establishment of a call. The SIP may include a signaling protocol for generating, correcting, and/or ending a session between entities (e.g., the electronic device 101 or the external electronic device 601) utilized to perform an IMS call. For example, the processor 120 may transmit the SIP INVITE message via a wireless communication circuitry (e.g., a first wireless communication circuitry 410, a 4G communication circuitry 420, or a WiFi communication circuitry 430 of FIG. 4).

According to an embodiment, the SIP INVITE message may include a list of codecs (e.g., resolutions) supportable by the electronic device 101.

In operation 615, confirm to the electronic device 101 that the request to establish the call was received without error, the external electronic device 101 may transmit a response message to the SIP INVITE message to the electronic device 101. The response message may include, for example, an "SIP OK" message. A processor 120 of the electronic device 101 may receive the SIP OK message via the wireless communication circuitry (e.g., the first wireless communication circuitry 410, the 4G communication circuitry 420, or the WiFi communication circuitry 430 of FIG. 4).

According to an embodiment, the SIP OK message may include information indicating a resolution of video call selected by the external electronic device 601. According to an embodiment, the external electronic device 601 may select the resolution of video call based on at least one of a priority, a policy, or a user setting. The processor 120 of the electronic device 101 may store the information indicating the resolution of the video call, included in the SIP OK message, in a memory 130 of FIG. 4.

Figure 7:
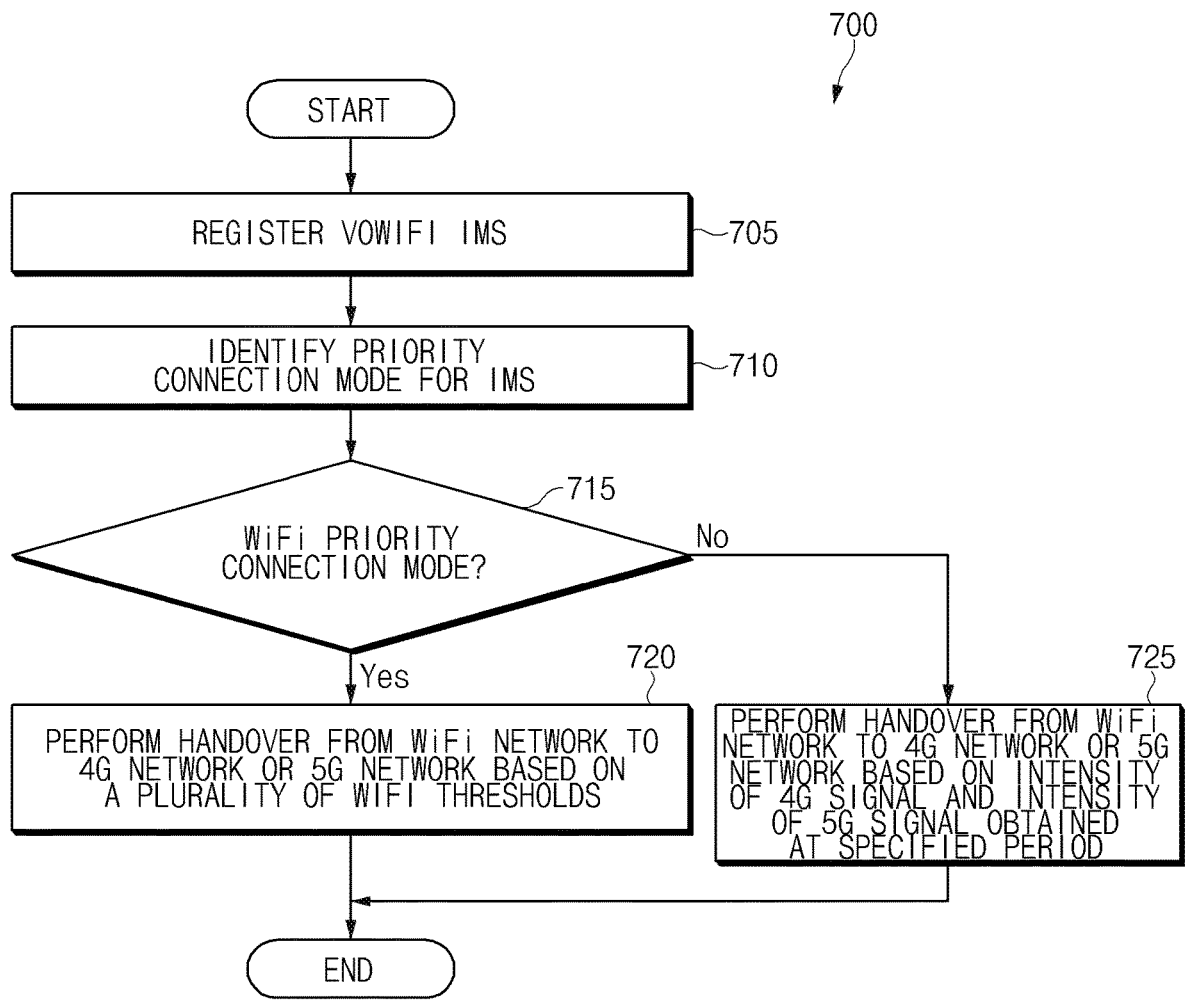
FIG. 7 is a flowchart illustrating an operation of an electronic device for performing a handover in a priority connection mode according to certain embodiments.

FIG. 7 is a flowchart 700 illustrating an operation of an electronic device 101 for performing a handover in a priority connection mode according to an embodiment. Operations shown in FIG. 7 may be performed by the electronic device 101 or by a component (e.g., a processor 120) of the electronic device 101.

According to an embodiment, the electronic device 101 may perform operations of the flowchart 700, while an IMS call function is performed, or while the device is operating in an idle state. According to an embodiment, the electronic device 101 may perform the operations of the flowchart 700 independently of operations of the flowchart 500 of FIG. 5. According to other embodiments, the electronic device 101 may perform the operations of the flowchart 700, as some (e.g., operations before operation 515 or operations before operation 530) of the operations of the flowchart 500 of FIG. 5. According to other embodiments, the electronic device 101 may perform the operations of the flowchart 500 of FIG. 5 as some (e.g., operation 720 or 725) of the operations of the flowchart of FIG. 7.

Referring to FIG. 7, in operation 705, the electronic device 101 may register a VoWiFi IMS. For example, the processor 120 may register an IMS with a WiFi network via a WiFi communication circuitry 430 of FIG. 4.

In operation 710, the electronic device 101 (or the processor 120) may identify a priority connection mode for the IMS. According to an embodiment, the priority connection mode may be determined based on at least one of QoS of the IMS (or an IMS call), a billing policy for a network, or determined according to a user setting.

In operation 715, the electronic device 101 (or the processor 120) may identify whether the priority connection mode is a WiFi priority connection mode or a cellular priority connection mode. When the priority connection mode is the WiFi priority connection mode, the processor 120 may identify that a WiFi network has priority over other channels, such as cellular. When the priority connection mode is the cellular priority connection mode, the processor 120 may identify that a cellular network has priority over other channels, such as WiFi.

When the priority connection mode is the WiFi priority connection mode, in operation 720, the electronic device 101 may perform a handover operation from the WiFi network to a 4G network or a 5G network, based on a plurality of WiFi thresholds. For example, the processor 120 may compare a WiFi signal intensity with a second WiFi threshold intensity higher than a predetermined first WiFi threshold intensity, to determine whether to perform a handover from the WiFi network to the cellular network.

When the priority connection mode is the cellular priority connection mode, in operation 725, the electronic device 101 may perform a handover from the WiFi network to the 4G network or the 5G network based on the intensity of a 4G signal and intensity of a 5G signal. The 4G and 5G signals may be obtained within a prespecified period, without regard to an intensity of a WiFi signal, which may increase a frequency of executing handovers to the cellular network.

Figure 8:
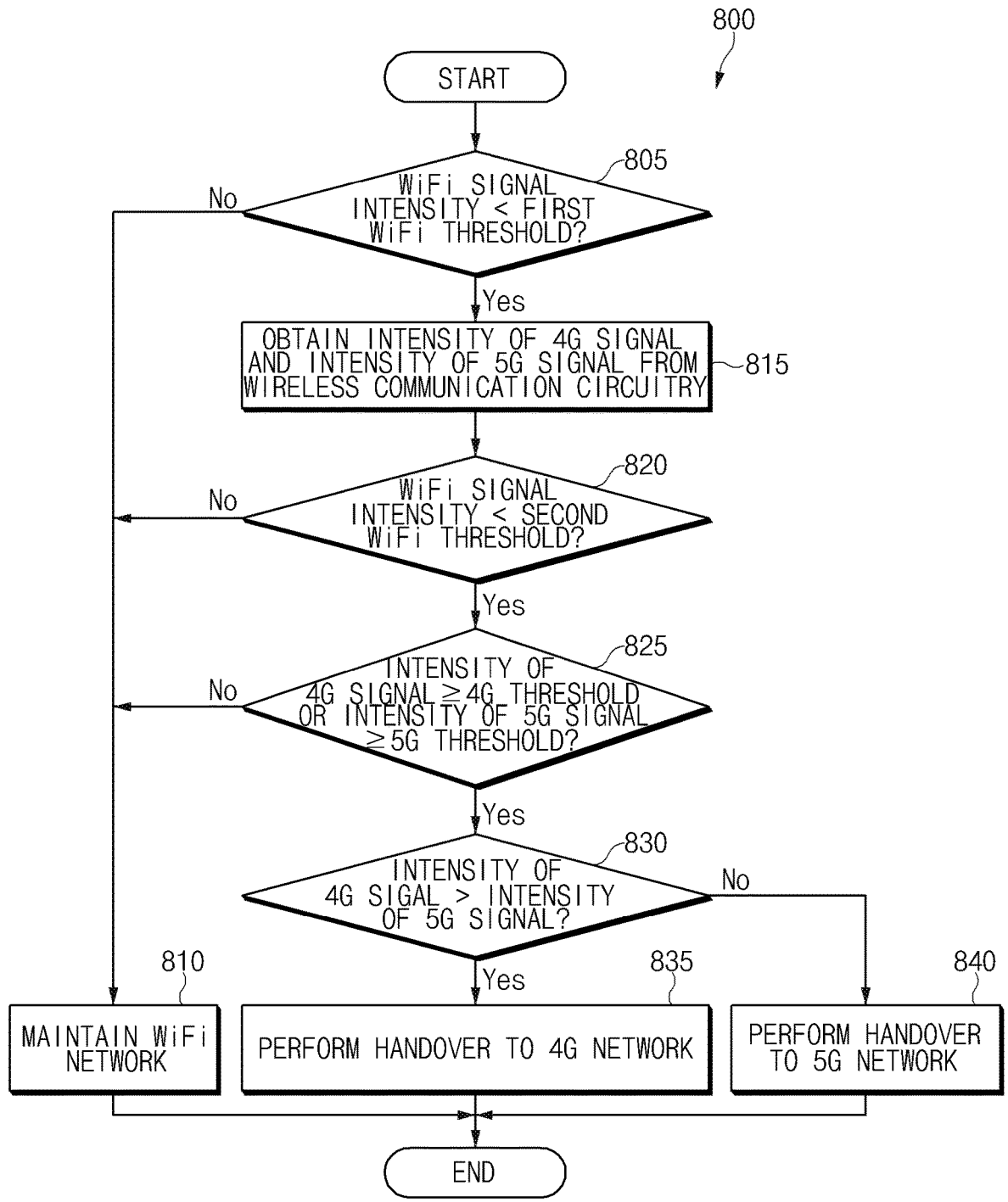
FIG. 8 is a flowchart illustrating an operation of an electronic device for performing a handover in a WiFi priority connection mode according to certain embodiments.

FIG. 8 is a flowchart 800 illustrating an operation of an electronic device 101 for performing a handover operation in a WiFi priority connection mode according to an embodiment. Operations shown in FIG. 8 may be performed by the electronic device 101, or may be performed by a component (e.g., a processor 120) of the electronic device 101. Operations of the flowchart 800 may in some embodiments be considered a sub-embodiment of the operation 720 of FIG. 7.

Referring to FIG. 8, in operation 805, the processor 120 may identify whether first WiFi signal intensity measured at a first time by a WiFi communication circuitry 430 of FIG. 4 is less than a first WiFi threshold intensity. The first WiFi threshold intensity may be greater than a second WiFi threshold intensity, which is used to trigger a handover operation from a WiFi network to a cellular network. When the WiFi signal intensity is greater than or equal to the first WiFi threshold intensity, in operation 810, the processor 120 may maintain the WiFi network without performing the handover operation.

When the first WiFi signal intensity is less than the first WiFi threshold intensity, then in operation 815, the processor 120 may obtain an intensity of a 4G signal and an intensity of a 5G signal from a wireless communication circuitry (e.g., a first wireless communication circuitry 410 or a 4G communication circuitry 420 of FIG. 4).

According to an embodiment, the first wireless communication circuitry 410 may measure intensity of a signal of a serving cell (e.g., a second cell 325 of FIG. 3). For example, the first wireless communication circuitry 410 may measure the intensity of a signal (e.g., a reference signal) received from a base station (e.g., a second base station 320 of FIG. 3). The intensity of the signal may be referred to as, for example, a reference signal received power (RSRP). The reference signal may include at least one of, for example, a cell specific reference signal, a channel state information-reference signal (CSI-RS), or a demodulation reference signal (DMRS), which is defined in 3GPP. For another example, the first wireless communication circuitry 410 may measure intensity of a signal (e.g., a 4G signal) on an adjacent cell (e.g., a first cell 315 of FIG. 4) using a system information block (SIB) received from the base station. In the same principle, the 4G communication circuitry 420 may measure intensity of a 4G signal or intensity of a 5G signal.

According to an embodiment, the processor 120 may perform operation 815 before operation 820, to prevent a handover from being delayed. Furthermore, because there is an increase in current consumed by the processor 120 when the processor 120 periodically obtains intensity of a 4G signal and intensity of a 5G signal from the wireless communication circuitry, the processor 120 may perform operation 815 specifically when a prespecified condition is detected (e.g., when the first WiFi signal intensity is less than the first WiFi threshold), thus reducing a potential amount of power consumed by the processor 120.

In operation 820, the processor 120 may identify whether second WiFi signal intensity measured at a second time by the WiFi communication circuitry 430 is less than the second WiFi threshold intensity. When the second WiFi signal intensity is greater than or equal to the second WiFi threshold intensity, in operation 810, the processor 120 may maintain the WiFi network without performing a handover to the cellular network.

When the second WiFi signal intensity is less than the second WiFi threshold intensity, in operation 825, the processor 120 may identify whether the intensity of the 4G signal is greater than or equal to a 4G threshold intensity or whether the intensity of the 5G signal is greater than or equal to a 5G threshold intensity. In other words, the processor 120 may identify whether any one of the intensity of the 4G signal or the intensity of the 5G signal is greater than or equal to a threshold. When the intensity of the 4G signal is less than the 4G threshold intensity or when the intensity of the 5G signal is less than the 5G threshold intensity, in operation 810, the processor 120 may maintain the WiFi network.

When the intensity of the 4G signal is greater than or equal to the 4G threshold intensity or whether the intensity of the 5G signal is greater than or equal to the 5G threshold intensity, in operation 830, the processor 120 may compare the intensity of the 4G signal with the intensity of the 5G signal. When the intensity of the 4G signal is greater than the intensity of the 5G signal, in operation 835, the processor 120 may perform a handover to the 4G network. When the intensity of the 5G signal is greater than or equal to the intensity of the 4G signal, in operation 840, the processor 120 may perform a handover to a 5G network.

Figure 9:
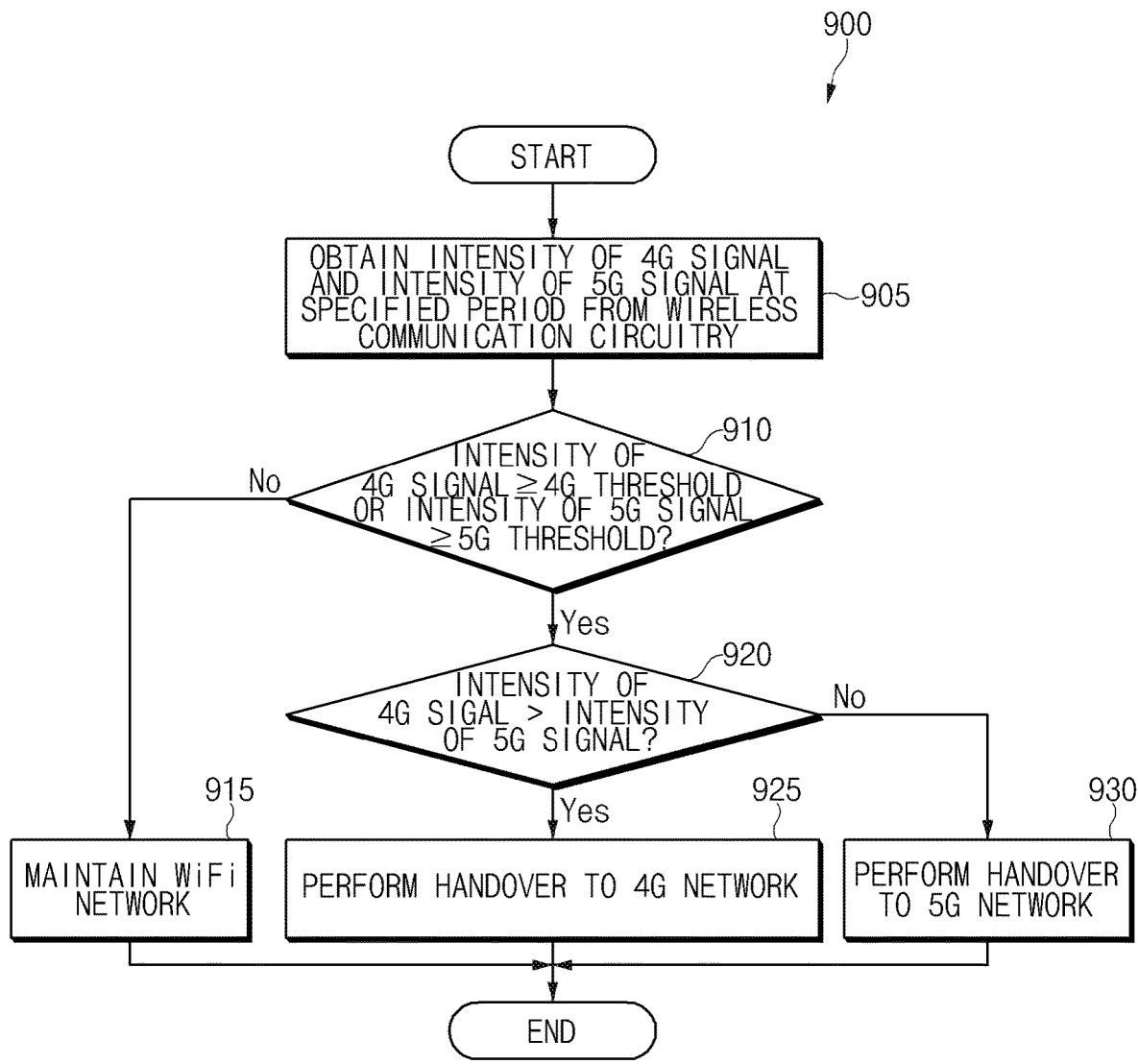
FIG. 9 is a flowchart illustrating an operation of an electronic device for performing a handover in a cellular priority connection mode according to certain embodiments.

FIG. 9 is a flowchart 900 illustrating an operation of an electronic device 101 for performing a handover in a cellular priority connection mode according to an embodiment. Operations shown in FIG. 9 may be performed by the electronic device 101, or by a component (e.g., a processor 120) of the electronic device 101. Operations of the flowchart 900 may be an embodiment of operation 725 of FIG. 7.

Referring to FIG. 9, in operation 905, the processor 120 may obtain an intensity of a 4G signal and an intensity of a 5G signal at a prespecified period from a wireless communication circuitry (e.g., a first wireless communication circuitry 410 or a 4G communication circuitry 420 of FIG. 4).

The first wireless communication circuitry 410 may measure the intensity of a signal of a serving cell (e.g., a second cell 325 of FIG. 3). For example, the first wireless communication circuitry 410 may measure the intensity of a signal (e.g., a reference signal) received from a base station (e.g., a second base station 320 of FIG. 3). The intensity of the signal may be referred to as, for example, an RSRP. The reference signal may include at least one of, for example, a cell specific reference signal, a CSI-RS, or a DMRS, which is defined in 3GPP. For another example, the first wireless communication circuitry 410 may measure the intensity of a signal (e.g., a 4G signal) on an adjacent cell (e.g., a first cell 315 of FIG. 4) using an SIB received from the base station. In the same principle, the 4G communication circuitry 420 may measure intensity of a 4G signal or intensity of a 5G signal.

Because there is an increase in power consumed by the processor 120 whenever the processor 120 obtains the intensity of a 4G signal and the intensity of a 5G signal from the wireless communication circuitry, the processor 120 may obtain the intensity of a 4G signal and intensity of a 5G signal at a prespecified period. For example, the processor 120 may obtain intensity of a 4G signal and intensity of a 5G signal from a communication processor whenever transmitting a "dead peer detection" (DPD) message transmitted to maintain a connection with an external server which manages VoWiFi.

In operation 910, the processor 120 may identify whether the intensity of the 4G signal is greater than or equal to a 4G threshold or whether the intensity of the 5G signal is greater than or equal to a 5G threshold. In other words, the processor 120 may identify whether any one of the intensity of the 4G signal or the intensity of the 5G signal is greater than or equal to a threshold. When the intensity of the 4G signal is less than the 4G threshold or when the intensity of the 5G signal is less than the 5G threshold, in operation 915, the processor 120 may maintain the WiFi network.

When the intensity of the 4G signal is greater than or equal to the 4G threshold or whether the intensity of the 5G signal is greater than or equal to the 5G threshold, in operation 920, the processor 120 may compare the intensity of the 4G signal with the intensity of the 5G signal. When the intensity of the 4G signal is greater than the intensity of the 5G signal, in operation 925, the processor 120 may perform a handover to a 4G network. When the intensity of the 5G signal is greater than or equal to the intensity of the 4G signal, in operation 930, the processor 120 may perform a handover to a 5G network.

As describe above, an electronic device (e.g., an electronic device 101 of FIG. 4) may include a first wireless communication circuitry (e.g., a first wireless communication circuitry 410 of FIG. 4) configured to support a 5G network, at least one second wireless communication circuitry (e.g., a second wireless communication circuitry 415 of FIG. 4) configured to support a 4G network or a WiFi network, at least one processor (e.g., a processor 120 of FIG. 4) operatively connected with the first wireless communication circuitry and the at least one second wireless communication circuitry, and a memory (e.g., a memory 130 of FIG. 4), operatively connected with the at least one processor, storing information indicating resolution of video call negotiated in a call establishment procedure, threshold resolution, and/or a default value. The memory may store instructions, when executed, causing the at least one processor to establish a call based on the 4G network or the WiFi network with an external electronic device via the at least one second wireless communication circuitry, identify the resolution of the video call negotiated in the call establishment procedure for establishing the call, set a reference value used to perform a handover to the 5G network to be less than the default value, when the identified resolution is greater than or equal to the threshold resolution, or fail to change the reference value, when the identified resolution is less than the threshold resolution, and perform a handover from the 4G network or the WiFi network to the 5G network, when intensity of a signal measured by the first wireless communication circuitry is greater than or equal to the set reference value.

According to an embodiment, the instructions may be configured to cause the at least one processor to transmit a request message for requesting to establish a call to the external electronic device, via the at least one second wireless communication circuitry, the request message including a list of resolution supportable by the electronic device, receive a response message to the request message from the external electronic device, via the at least one second wireless communication circuitry, and identify the resolution of the video call included in the response message.

According to an embodiment, the request message may include a session initiation protocol (SIP) invite message defined in the 3GPP standard. The response message may include an SIP OK message defined by the 3GPP standard.

According to an embodiment, the at least one second wireless communication circuitry may include a 4G communication circuitry (e.g., a 4G communication circuitry 420 of FIG. 4) configured to support the 4G network and a WiFi communication circuitry (e.g., a WiFi communication circuit 430 of FIG. 4) configured to support the WiFi network. The instructions may be configured to cause the at least one processor to register an internet protocol multimedia subsystem (IMS) with the WiFi network via the WiFi communication circuitry, identify a priority connection mode for the IMS, perform a handover from the WiFi network to the 5G network or the 4G network based at least in part on a plurality of thresholds for performing a handover to the WiFi network, when the identified priority connection mode is a WiFi priority connection mode, and perform the handover from the WiFi network to the 5G network or the 4G network based at least in part on 4G signal intensity and 5G signal intensity obtained at a specified period, when the identified priority connection mode is a cellular priority connection mode.

According to an embodiment, the instructions may be configured to cause the at least one processor to identify whether first WiFi signal intensity measured at a first time is less than a first threshold, when the identified priority connection mode is the WiFi priority connection mode, obtain the 5G signal intensity from the first wireless communication circuitry and obtain the 4G signal intensity from the 4G communication circuitry, when the WiFi signal intensity measured at the first time is less than the first threshold, identify whether second WiFi signal intensity measured at a second time is less than a second threshold less than the first threshold, and perform the handover from the WiFi network to the 5G network or the 4G network based at least in part on the obtained 5G signal intensity and the obtained 4G signal intensity, when the second WiFi signal intensity is less than the second threshold.

According to an embodiment, the instructions may be configured to cause the at least one processor to fail to perform a handover, when the obtained 4G signal intensity is less than or equal to a third threshold and when the obtained 5G signal intensity is less than or equal to a fourth threshold, and perform the handover from the WiFi network to the 5G network or the 4G network based on the result of comparing the obtained 5G signal intensity with the obtained 4G signal intensity, when the obtained 4G signal intensity is greater than the third threshold or when the obtained 5G signal intensity is greater than the fourth threshold.

According to an embodiment, the instructions may be configured to cause the at least one processor to perform a handover from the WiFi network to the 4G network, when the obtained 4G signal intensity is greater than the obtained 5G signal intensity, and perform a handover from the WiFi network to the 5G network, when the obtained 4G signal intensity is less than or equal to the obtained 5G signal intensity.

According to an embodiment, the instructions may be configured to cause the at least one processor to obtain the 5G signal intensity from the first wireless communication circuitry at the specified period and obtain the 4G signal intensity from the 4G communication circuitry at the specified period, when the identified priority connection mode is the cellular priority connection mode, and perform the handover from the WiFi network to the 5G network or the 4G network based at least in part on the obtained 5G signal intensity and the obtained 4G signal intensity.

According to an embodiment, the instructions may be configured to cause the at least one processor to obtain the 4G signal intensity and the 5G signal intensity at a period for transmitting a dead peer detection (DPD) message for maintaining a connection with a service configured to support the WiFi network.

As described above, a method of an electronic device (e.g., an electronic device 101 of FIG. 1) may include establishing (operation 505 of FIG. 5 for establishing) a call based on a 4G network or a WiFi network with an external electronic device, identifying (operation 510 of FIG. 5 for identifying) resolution of video call negotiated in a call establishment procedure for establishing the call, setting (e.g., operation 520 of FIG. 5 for setting) a reference value used to perform a handover to a 5G network to be less than a default value, when the identified resolution is greater than or equal to threshold resolution, and performing (e.g., operation 530 of FIG. 5 for performing) a handover from the 4G network or the WiFi network to the 5G network, when intensity of a signal measured from the 5G network is greater than or equal to the set reference value.

According to an embodiment, the establishing of the call based on the 4G network or the WiFi network may include transmitting a request message for requesting to establish a call to the external electronic device and receiving a response message to the request message from the external electronic device. The response message may include information about the resolution of the video call.

According to an embodiment, the performing of the handover from the 4G network or the WiFi network to the 5G network may include registering an IMS with the WiFi network, identifying a priority connection mode for the IMS, and performing a handover from the WiFi network to the 5G network based on a plurality of thresholds for performing a handover to the WiFi network, when the identified priority connection mode is a WiFi priority connection mode, or performing the handover from the WiFi network to the 5G network based on 4G signal intensity and 5G signal intensity obtained at a specified period, when the identified priority connection mode is a cellular priority connection mode.

According to an embodiment, the method may further include identifying whether first WiFi signal intensity measured at a first time is less than a first threshold, when the identified priority connection mode is the WiFi priority connection mode, obtaining the 5G signal intensity and the 4G signal intensity, when the first WiFi signal is less than the first threshold, identifying whether second WiFi signal intensity measured at a second time is less than a second threshold greater than the first threshold, and performing the handover from the WiFi network to the 5G network based on the obtained 5G signal intensity and the obtained 4G signal intensity, when the second WiFi signal intensity is less than the second threshold.

According to an embodiment, the method may further include obtaining the 5G signal intensity and the 4G signal intensity at the specified period, when the identified priority connection mode is the cellular priority connection mode and performing the handover from the WiFi network to the 5G network based on the obtained 5G signal intensity and the obtained 4G signal intensity.

According to an embodiment, the specified period may include a period for transmitting a dead peer detection (DPD) message for maintaining a connection with a server configured to support the WiFi network.

As described above, an electronic device (e.g., an electronic device 101 of FIG. 4) may include a 5G communication circuitry (e.g., a first wireless communication circuitry 410 of FIG. 4) configured to support a 5G network, a 4G communication circuitry (e.g., a 4G communication circuitry 420 of FIG. 4) configured to support a 4G network, a WiFi communication circuitry (e.g., a WiFi communication circuitry 430 of FIG. 4) configured to support a WiFi network, and at least one processor (e.g., a processor 120 of FIG. 4) operatively connected with the 5G communication circuitry, the 4G communication circuitry, and the WiFi communication circuitry. The at least one processor may be configured to register an internet protocol multimedia subsystem (IMS) with the WiFi network via the WiFi communication circuitry, identify a priority connection mode for the IMS, perform a handover from the WiFi network to the 5G network or the 4G network based on a plurality of thresholds for performing a handover to the WiFi network, when the identified priority connection mode is a WiFi priority connection mode, and perform the handover from the WiFi network to the 5G network or the 4G network based on 4G signal intensity and 5G signal intensity obtained at a specified period, when the identified priority connection mode is a cellular priority connection mode.

According to an embodiment, the at least one processor may be configured to identify whether first WiFi signal intensity measured at a first time is less than a firs threshold, when the identified priority connection mode is the WiFi priority connection mode, obtain the 5G signal intensity from the 5G communication circuitry and obtain the 4G signal intensity from the 4G communication circuitry, when the first WiFi signal intensity is the first threshold, identify whether second WiFi signal intensity measured at a second time is less than a second threshold greater than the first threshold, and perform the handover from the WiFi network to the 5G network or the 4G network based on the obtained 5G signal intensity and the obtained 4G signal intensity, when the second WiFi signal intensity is less than the second threshold.

According to an embodiment, the at least one processor may be configured to fail to perform a handover, when the obtained 4G signal intensity is less than or equal to a third threshold and when the obtained 5G signal intensity is less than or equal to a fourth threshold and perform the handover from the WiFi network to the 5G network or the 4G network based on the result of comparing the obtained 5G signal intensity with the obtained 4G signal intensity, when the obtained 4G signal intensity is greater than the third threshold or when the obtained 5G signal intensity is greater than the fourth threshold.

According to an embodiment, the at least one processor may be configured to perform a handover from the WiFi network to the 4G network, when the obtained 4G signal intensity is greater than the obtained 5G signal intensity, and perform a handover from the WiFi network to the 5G network, when the obtained 4G signal intensity is less than or equal to the obtained 5G signal intensity.

According to an embodiment, the at least one processor may be configured to obtain the 5G signal intensity from the 5G wireless communication circuitry at the specified period and obtain the 4G signal intensity from the 4G communication circuitry at the specified period, when the identified priority connection mode is the cellular priority connection mode, and perform the handover from the WiFi network to the 5G network or the 4G network based on the obtained 5G signal intensity and the obtained 4G signal intensity.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to certain embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to certain embodiments disclosed in the disclosure, the electronic device and the method may perform a handover between heterogeneous networks including a wireless network, particularly, the 5G network.

According to certain embodiments disclosed in the disclosure, the electronic device may perform a call function based on the 5G network, thus providing a high-quality video call service.

According to certain embodiments disclosed in the disclosure, the electronic device may perform a handover between the heterogeneous networks including the 5G network, thus ensuring call continuity.

In addition, various effects directly or indirectly ascertained through the disclosure may be provided.

While the disclosure has been shown and described with reference to certain embodiments thereof, it will be understood by those skilled in the art that various changes in form and details may be made therein without departing from the disclosure as defined by the appended claims and their equivalents.

What is claimed is:
1. An electronic device, comprising:
first wireless communication circuitry configured to support a $5^{th}$ generation (5G) network;
second wireless communication circuitry configured to support a $4^{th}$ generation (4G) network or a wireless fidelity (WiFi) network;

at least one processor operatively connected with the first wireless communication circuitry and the second wireless communication circuitry; and a memory operatively connected with the at least one processor, wherein the memory stores instructions that are executable to cause the at least one processor to:

establish a video call with an external electronic device on the 4G network or the WiFi network, via the second wireless communication circuitry;

identify a resolution of the video call, as negotiated within a call establishment procedure executed to establish the video call;

set a reference value for executing a first handover to the 5G network to be less than a default value, when the identified resolution is greater than or equal to a predetermined threshold resolution;

maintain the reference value, when the identified resolution is less than the predetermined threshold resolution; and perform the first handover from the 4G network or the WiFi network to the 5G network, when intensity of a signal measured by the first wireless communication circuitry is greater than or equal to the reference value.

2. The electronic device of claim 1, wherein the instructions are configured to cause the at least one processor to:

transmit a request to establish the video call to the external electronic device, via the second wireless communication circuitry, the request including a list of resolutions supported by the electronic device;

receive a response to the request from the external electronic device, via the second wireless communication circuitry; and wherein the resolution of the video call is included in the response.

3. The electronic device of claim 2, wherein the request includes a session initiation protocol (SIP) invite message, and wherein the response includes an SIP OK message.

4. The electronic device of claim 1, wherein the second wireless communication circuitry includes:

a 4G communication circuitry configured to support the 4G network; and a WiFi communication circuitry configured to support the WiFi network, and wherein the instructions are configured to cause the at least one processor to:

register an internet protocol multimedia subsystem (IMS) with the WiFi network via the WiFi communication circuitry;

identify a priority connection mode for the IMS;

when connected to the WiFi network, perform a second handover from the WiFi network to the 5G network or the 4G network based at least in part on a plurality of thresholds for performing a third handover to the WiFi network, when the identified priority connection mode is a WiFi priority connection mode, and perform the second handover from the WiFi network to the 5G network or the 4G network based at least in part on 4G signal intensity and 5G signal intensity obtained during a prespecified period, when the identified priority connection mode is a cellular priority connection mode.

5. The electronic device of claim 4, wherein the instructions are configured to cause the at least one processor to:

identify whether a first WiFi signal intensity measured at a first time is less than a first threshold intensity, when the identified priority connection mode is the WiFi priority connection mode;

obtain the 5G signal intensity from the first wireless communication circuitry and obtain the 4G signal intensity from the 4G communication circuitry, when the first WiFi signal intensity measured at the first time is less than the first threshold;

identify whether a second WiFi signal intensity measured at a second time is less than a second threshold intensity less than the first threshold intensity; and perform the second handover from the WiFi network to the 5G network or the 4G network based at least in part on the obtained 5G signal intensity and the obtained 4G signal intensity, when the second WiFi signal intensity is less than the second threshold intensity.

6. The electronic device of claim 5, wherein the instructions are configured to cause the at least one processor to:

maintain connection to the WiFi network without performing the second handover, when the obtained 4G signal intensity is less than or equal to a third threshold intensity and when the obtained 5G signal intensity is less than or equal to a fourth threshold intensity; and perform the second handover from the WiFi network to the 5G network or the 4G network based on the comparing of the obtained 5G signal intensity with the obtained 4G signal intensity, when the obtained 4G signal intensity is greater than the third threshold intensity or when the obtained 5G signal intensity is greater than the fourth threshold intensity.

7. The electronic device of claim 6, wherein performing the second handover from the WiFi network to one of the 4G and the 5G network comprises:

perform the second handover from the WiFi network to the 4G network, when the obtained 4G signal intensity is greater than the obtained 5G signal intensity; and perform the second handover from the WiFi network to the 5G network, when the obtained 4G signal intensity is less than or equal to the obtained 5G signal intensity.

8. The electronic device of claim 4, wherein the instructions are configured to cause the at least one processor to:

obtain the 5G signal intensity from the first wireless communication circuitry at the prespecified period, and obtain the 4G signal intensity from the 4G communication circuitry at the prespecified period, when the identified priority connection mode is the cellular priority connection mode; and perform the second handover from the WiFi network to the 5G network or the 4G network based at least in part on the obtained 5G signal intensity and the obtained 4G signal intensity.

9. The electronic device of claim 8, wherein the instructions are configured to cause the at least one processor to:

obtain the 4G signal intensity and the 5G signal intensity at a transmission period of a dead peer detection (DPD) message used to determine whether to maintain a connection with a service configured to support the WiFi network.

10. A method of an electronic device, the method comprising:

establishing, by a first wireless communication circuitry, a video call with an external electronic device over a 4G network or a WiFi network identifying, by a processor, resolution of video call, as negotiated within a call establishment procedure for establishing the video call;

setting, by the processor, a reference value for executing a first handover to a 5G network to be less than a default value, when the identified resolution is greater than or equal to a predetermined threshold resolution; and performing the first handover from the 4G network or the WiFi network to the 5G network, when intensity of a signal from the 5G network is greater than or equal to the set reference value.

11. The method of claim 10, wherein the establishing the video call over the 4G network or the WiFi network includes:

transmitting a request to establish the video call to the external electronic device; and receiving a response to the request from the external electronic device, wherein the resolution of the video call is included in the response.

12. The method of claim 10, wherein the performing of the first handover from the 4G network or the WiFi network to the 5G network includes:

registering an IMS with the WiFi network using a WiFi communication circuitry included in the first wireless communication circuitry;

identifying a priority connection mode for the IMS; and performing the first handover from the WiFi network to the 5G network based on a plurality of thresholds for performing a second handover to the WiFi network, when the identified priority connection mode is a WiFi priority connection mode, and performing the first handover from the WiFi network to the 5G network based on 4G signal intensity and 5G signal intensity obtained at a prespecified period, when the identified priority connection mode is a cellular priority connection mode.

13. The method of claim 12, further comprising:

identifying whether first WiFi signal intensity measured at a first time is less than a first threshold intensity, when the identified priority connection mode is the WiFi priority connection mode;

obtaining the 5G signal intensity and the 4G signal intensity, when the first WiFi signal is less than the first threshold intensity;

identifying whether second WiFi signal intensity measured at a second time is less than a second threshold intensity greater than the first threshold intensity; and performing the first handover from the WiFi network to the 5G network based on the obtained 5G signal intensity and the obtained 4G signal intensity, when the second WiFi signal intensity is less than the second threshold intensity.

14. The method of claim 12, further comprising:

obtaining the 5G signal intensity and the 4G signal intensity at the prespecified period, when the identified priority connection mode is the cellular priority connection mode; and performing the first handover from the WiFi network to the 5G network based on the obtained 5G signal intensity and the obtained 4G signal intensity.

15. The method of claim 14, wherein the prespecified period is a period of time in which a DPD message is transmitted in order to determine whether to maintain a connection with a server configured to support the WiFi network.

* * * * *